June 13, 1967 J. F. O'NEILL, JR 3,325,598

REMOTE CONDITION MONITORING CIRCUIT WITH RINGING CURRENT ACTUATED SWITCH CONNECTING TWO-MODE OSCILLATOR TO TELEPHONE LINE

Filed Sept. 18, 1963 3 Sheets-Sheet 1

INVENTOR
J. F. O'NEILL, JR.
BY
Charles Scott Phelan
ATTORNEY

United States Patent Office 3,325,598
Patented June 13, 1967

3,325,598

REMOTE CONDITION MONITORING CIRCUIT WITH RINGING CURRENT ACTUATED SWITCH CONNECTING TWO-MODE OSCILLATOR TO TELEPHONE LINE

John F. O'Neill, Jr., Eatontown, N.J., assignor to Bell Telephone Laboratories, Incorporated, New York, N.Y., a corporation of New York Filed Sept. 18, 1963, Ser. No. 309,680
10 Claims. (Cl. 179—2)

ABSTRACT OF THE DISCLOSURE

A switching circuit responds to a burst of alternating current supplied over a line connection to couple direct current from the same line connection to supply operating energy to an oscillator. The switching circuit operation is controlled by a predetermined level of charge accumulated in response to the alternating current. A condition-responsive device in the oscillator fixes different modes of oscillator operation in response to corresponding different conditions. Various forms of the switch circuit and the oscillator are shown. The line connection includes in one embodiment a calling telephone and a central office for controlling the application of alternating and direct currents to the switching unit at a called location.

This invention relates to a condition monitoring circuit and more particularly it relates to such a circuit which is useful in conjunction with telephone systems but is not restricted in its application to such sytstems.

The problem of monitoring conditions is one which is encountered in a broad variety of fields. The present invention, however, is particularly useful in situations where it is desirable to monitor a condition from a geographically remote location but wherein the condition is of insufficient importance to warrant the installation of automatic alarm equipment. For example, the use of telephone circuits for monitoring purposes is known, and it is also known to employ condition responsive equipment for automatically dialing a predetermined telephone number to give an alarm in the event of a certain change in the condition being monitored. Such automatic dialing equipment is, however, relatively expensive and may not be warranted in some situations where a monitor would be convenient.

Also known in the telephone art are equipments which are responsive to ringing current for connecting an answering machine to a telephone line for applying a prerecorded message thereto and for subsequently coupling recording equipment to the telephone line to receive a message from the calling party. This latter type of answering equipment is also quite complex and expensive and therefore not well adapted to monitoring low priority conditions.

The prior art further includes mechanical attachments for telephone instruments for actuating the switch hook contacts thereof in response to predetermined conditions of temperature, humidity, or the like. In these equipments one who desires to determine the status of the monitored condition simply dials the number of the instrument with the monitoring equipment and hears a ringing tone if the condition is satisfactory, or a busy tone if the condition is unsatisfactory. This type of equipment has a number of disadvantages, however, in that there is always the uncertainty that a fault in the telephone line could result in the caller hearing signals corresponding to one or the other of the conditions sought without having achieved a through connection to the called station. Also, the production of an unsatisfactory condition at the monitored location necessarily actuates the switch hook contacts of the telephone instrument and thereby ties up central office equipment needlessly, unless the interested party happens by coincidence to call to determine the condition status shortly after the unsatisfactory condition is produced.

It is accordingly one object of the present invention to monitor a condition at a remote location by improved electric circuit techniques.

It is another object to utilize a telephone system in an improved manner for monitoring the condition at a remote location.

A further object is to power monitoring equipment at a remote location by means of energy supplied from a telephone system switching station, but to do so without utilizing such station power until an interested party dials a number assigned to the monitoring equipment to determine the condition status.

Still another object is to monitor the status of a condition at a remote location in a manner such that the status singal produced upon interrogation of the monitoring equipment indicates positively whether or not the electric circuit connection between monitoring and interrogating locations is operating properly.

The various objects and advantages of the invention are realized in an illustrative embodiment wherein a squegging oscillator is located in the area of the condition to be monitored and has condition responsive contacts connected therein for controlling its mode of operation to produce either continuous or squegging oscillations. Switching means are provided for coupling the oscillator to an electric circuit, and such switching means are adapted to respond to alternating current energy in the circuit. The same switching means connects the oscillator to receive operating power from such circuit and applies the oscillator output oscillations to such circuit.

It is a feature of an embodiment of the present invention that the condition responsive contacts are magnetically coupled into the oscillator circuit so that either intentional or accidental actuation thereof does not produce undue disturbance in the electric circuit supplying operating power and alternating current energy.

It is another feature that the electric circuit to which the oscillator is connected can be a telephone subscriber line coupled to a central office which then supplies direct current and ringing current in the usual manner for telephone subscriber circuits in response to the dialing from another subscriber station of a telephone number assigned to the monitoring equipment.

A further feature of the invention is that the oscillator produces either continuous or squegging oscillations in response to predetermined statuses of the monitored condition so that a calling party in a telephone system can distinguish clearly between the status signals and ordinary telephone system supervisory signals.

Still another feature of the invention is that it is simple, of small size, and need not necessarily be associated with an actual telephone subscriber instrument.

Yet another feature of the invention is that when it is used in conjunction with a telephone system the switching means coupling the oscillator to the telephone subscriber line produces electric circuit conditions on that line which are substantially the same as conditions produced by a telephone subscriber instrument in normal operation so that each interrogation of the monitoring equipment may be properly charged to the calling party as a completed call.

The various features, objects, and advantages of the present invention may be more clearly understood upon consideration of the following detailed description of certain illustrative embodiments in connection with the appended claims and the attached drawing in which:

Figures 1, 2, 3:
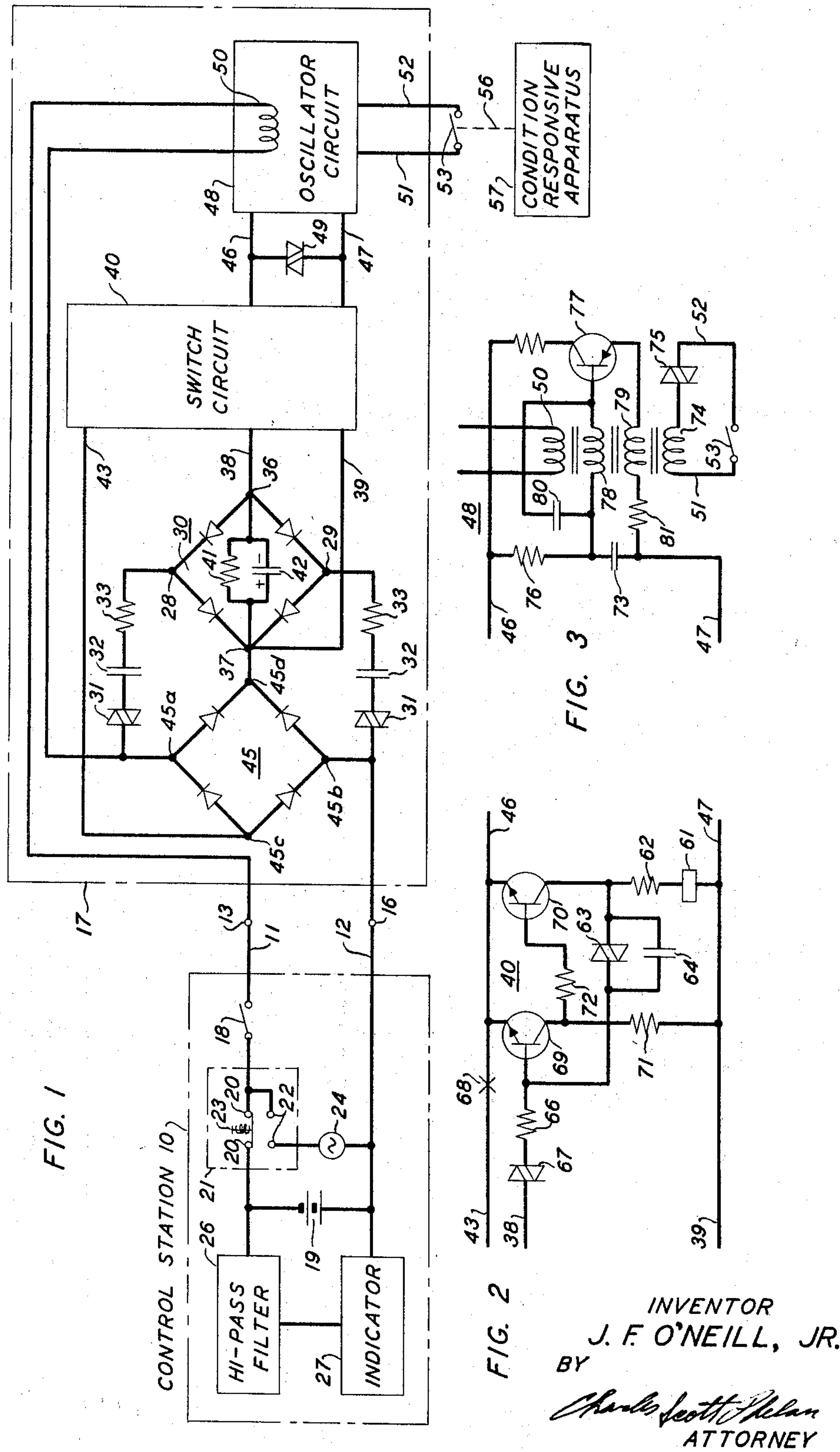
FIG. 1 is a diagram partially in schematic form and partially in block diagram form illustrating a first embodiment of the invention.
FIGS. 2 and 3 are schematic diagrams of particular forms of circuits which may be employed in blocks of the circuit of FIG. 1.

In FIG. 1 a control station 10 supplies electric signals on conductors 11 and 12 of an electric circuit to the terminals 13 and 16 of a monitoring unit 17 in accordance with the present invention. Station 10 includes a switch 18 for connecting station 10 in operative relationship with the electric circuit conductors 11 and 12. When switch 18 is closed direct current from a battery 19 is connected to those conductors through the normally closed contacts 20 of a push button switch 21. The switch 21 also includes a set of normally open contacts 22 which are closed by operation of an actuator 23 to connect alternating current to the circuit conductors 11 and 12 through switch 18. A high-pass filter 26 and an indicator 27 are connected in series across the terminals of battery 19 for a purpose which will become evident as the description proceeds. It is sufficient at this point to note that filter 26 has a characteristic which presents a much higher impedance to the frequency of the output energy from the alternating current source 24 than it does the higher frequencies.

Interrogation of the monitoring unit in accordance with the present invention is accomplished by closing switch 18 in control station 10 and then depressing the actuator 23 of the push button switch 21 for a short interval of time. This applies alternating current energy via the conductors 11 and 12 to the monitoring unit 17. Such energy is applied to input diagonal terminals 28 and 29 of a full wave rectifier bridge 30 through varistors 31, direct current blocking capacitors 32, and current limiting resistors 33. Output diagonal terminals 36 and 37 of bridge 30 are connected through leads 38 and 39 to two input terminals of a switching circuit 40.

Also connected across the output diagonal terminals 36 and 37 of the rectifier bridge are a parallel-connected resistor 41 and capacitor 42. Upon the initial application of alternating current to the bridge 30, capacitor 42 represents essentially a short circuit between the bridge output terminals. The latter capacitor charges rapidly, however, and ultimately attains a charge of sufficient magnitude to actuate the switching circuit 40. Details of this switching circuit and the operations thereof will be subsequently discussed. The result of the operation of circuit 40, however, is that a direct current conduction path is established from a lead 43 connected to another input of switching circuit 40 to an output lead 46 thereof. An output return lead 47 is also provided for switching circuit 40. Direct potential appearing between leads 46 and 47 in response to the operation of switching circuit 40 is applied to an oscillator circuit 48 and the magnitude of that direct potential is regulated by a varistor 49.

Varistors 31 and 49, and others to be mentioned herein, are bidirectional conduction devices to which a predetermined minimum potential difference must be applied before conduction will begin. Varistor units, or cells, may be connected in series to build up the value of minimum conduction potential required. However, in the figures of the drawing only one unit is indicated for each application, but it is to be understood that the illustrated unit represents schematically the number required to produce the described operation with the source magnitudes used in any particular application of the invention.

A polarity guard, full wave rectifier bridge 45, has its input diagonal terminals 45*a* and 45*b* connected across the input of monitor unit 17 and its output diagonal terminals

45*c* and 45*d* connected to lead 43 and to terminal 37, respectively. Bridge 45 is included in the circuit to assure proper operation thereof even though input terminals 13 and 16 may be inadvertently interchanged during installation of a monitoring unit. Direct current from battery 19 may be considered to enter the monitoring unit at terminal 16 and then pass along a path including terminal 45*b*, terminal 45*d*, lead 39, switching circuit 40 and varistor 49, lead 43, terminal 45*c*, terminal 45*a*, coil 50, and input terminal 13. Blocking capacitors 32 prevent such direct current from reaching bridge 30. Thus, the bridges 30 and 45 comprise rectifying means for coupling both operating and triggering signals from conductors 11–12 to the switching circuit 40.

Figures 3A, 3B, 4, 5:
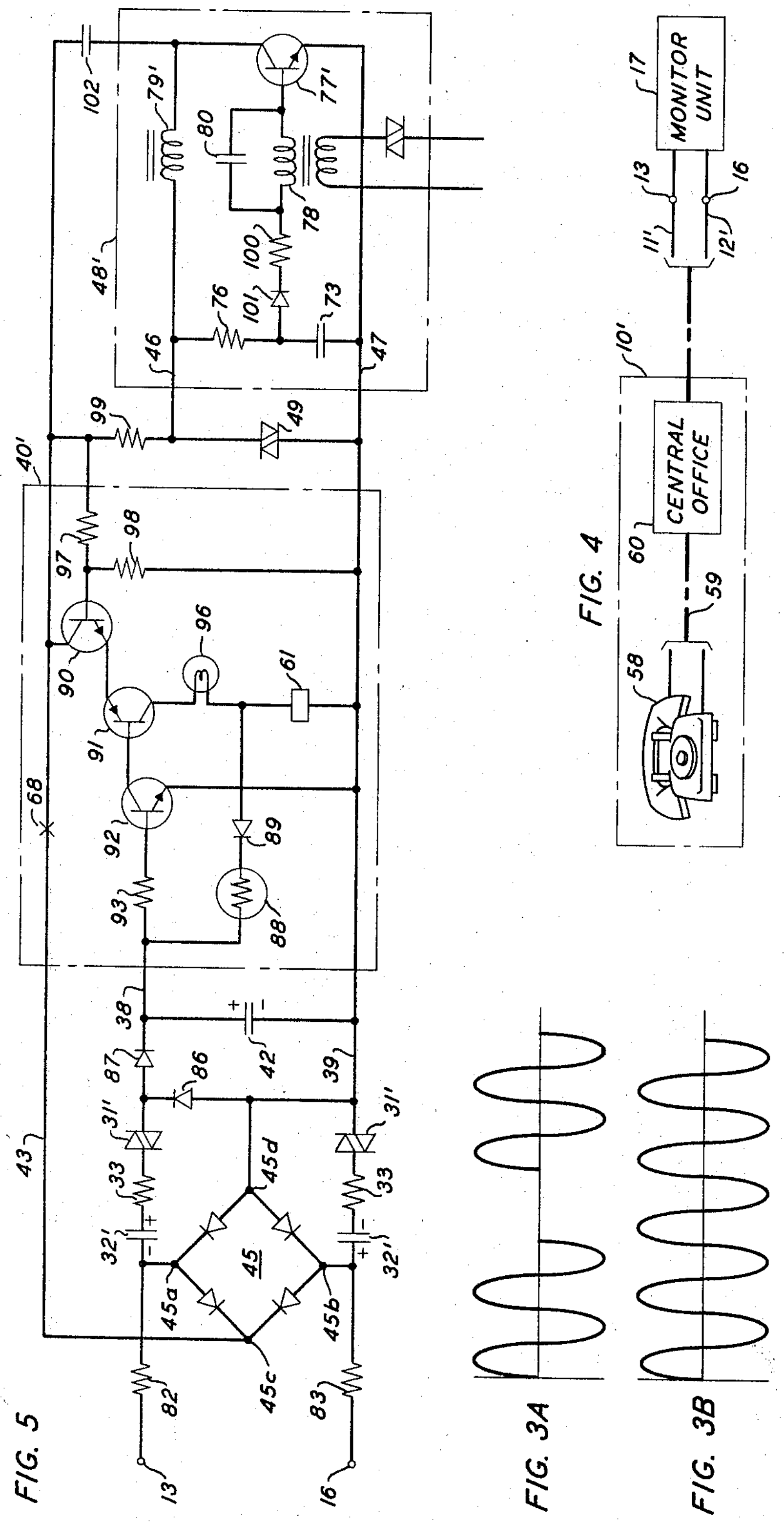
FIGS. 3A and 3B are wave diagrams illustrating the operation of the circuit of FIG. 3.
FIG. 4 is a simplified block and line diagram of a modification of the embodiment of FIG. 1.
FIGS. 5 and 6 are schematic diagrams of additional embodiments of the invention.

The direct potential applied to oscillator 48 is utilized to initiate operation of that circuit in an oscillatory manner. Oscillator circuit 48 advantageously has two modes of oscillatory operation. In one such mode the oscillator produces across its output winding 50 continuous oscillations as illustrated in FIG. 3B, and in a second mode of operation it produces across the winding 50 interrupted bursts of oscillations at substantially the same frequency, as illustrated in FIG. 3A. This latter mode of operation is variously designated in the art as squegging, self-quenching, or self-pulsing operation.

Two leads 51 and 52 connect contacts 53 to oscillator circuit 48. Contacts 53 are actuated mechanically as schematically indicated by broken line 56 connecting such contacts to any suitable condition responsive apparatus 57. The latter apparatus may take any of the numerous well-known forms which, to name just a few, may include a temperature sensitive element, a building closure, or an "empty" switch on a vending machine. In the remainder of the present description it will be assumed that the condition being monitored is the temperature of a room. If such temperature is within satisfactory limits, contacts 53 are maintained in their open condition as illustrated, and oscillator circuit 48 operates in its squegging mode, producing across its output transformer winding 50 the bursts of oscillations illustrated in FIG. 3A. If, however, the temperature goes outside of the prescribed limits, the apparatus 57 closes contacts 53 to shift oscillator circuit 48 to its continuous oscillation mode of operation for producing across transformer winding 50 the continuous oscillations as illustrated in FIG. 3B.

Winding 50 is in FIG. 1 connected in series in the input lead of monitoring unit 17 that is connected to input terminal 13. Oscillations of either type are transmitted to control station 10 over conductor 11 and returned via conductor 12 to terminal 16. The oscillations find a return path to the coil 50 through the polarity guard bridge 45, lead 39, switching circuit 40 and varistor 49, lead 43, and bridge 45 once more. Varistors 31 are selected to have breakdown voltages so that they conduct in response to alternating current of the magnitude provided by source 24 in control station 10, but so that they do not conduct alternating current of the magnitude produced by oscillator circuit 48. Thus, after switch 21 is released and alternating current from source 24 is terminated, the varistors 31 block the application of oscillations from the oscillator circuit 48 to the bridge 30. Accordingly, capacitor 42 in that bridge discharges through resistor 41 and thereby permits the restoration of the switching circuit 40 to its unoperated condition at a predetermined maximum time after the termination of alternating current from source 24.

In control station 10, the full wave rectified oscillations received from monitor unit 17 are transmitted through the filter 26 to an indicator 27 which may be of any suitable type, either visible or audible. An attendant at station 10 can tell whether contacts 53 are open or closed by reference to the characteristic nature of the signals for the two conditions as illustrated in FIGS. 3A and 3B. If a plurality of conditions are to be monitored, switch 18 would be a stepping switch associated with equipment for automatically operating switch 21 at each step and recording the received signal on indicator 27.

Thus, the electric circuit conductors 11–12 may be any suitable length and extend over any terrain. Regardless of the extent of such circuit, the monitoring unit 17 is completely inoperative until the interrogation switch 18 has been closed and alternating current energy applied from source 24 to the circuit conductors 11 and 12. Thereafter the release of switch 21 substitutes direct current for the alternating current of source 24 and also couples the indicator 27 to conductors 11 and 12 for observing the output of the monitoring unit 17.

FIG. 4 illustrates an alternate form which the control station 10 may take. In this figure, control station 10′ includes an ordinary telephone subscriber's instrument 58, which is, for descriptive convenience, illustrated as being a dial instrument. The telephone 58 is connected by the usual subscriber's loop circuit 59 to a central office 60 which is responsive to electrical conditions produced at the telephone 58 for performing well-known line selection and connection functions. Another of the subscriber circuits radiating from the central office 60 comprises the electric circuit conductors 11′ and 12′ which are coupled to the input terminals 13 and 16 of a monitoring unit as described in connection with FIG. 1. If a remote calling party lifts the handset of the telephone 58 and dials the telephone number assigned to the line 11′–12′, the central office 60 responds in the usual manner to accomplish connection thereto and to supply ringing current from the central office 60 to the monitoring unit 17. This ringing current corresponds to the alternating current supplied by source 24 in FIG. 1 and charges the capacitor 42 in monitor unit 17 to actuate switching circuit 40.

Considering FIG. 1 with the control station of FIG. 4 incorporated therein, the impedance presented by monitoring unit 17 to the loop circuit conductors 11′–12′ prior to the operation of switch circuit 40 is arranged to be essentially the same as that presented by a telephone instrument in the idle condition with switchhook contacts open. However, the operation of switching circuit 40 alters those impedance conditions in much the same fashion as is experienced when the handset of a telephone instrument is lifted to answer a call because the impedance of circuit 40 and varistor 49 predominates at that time. Thus, monitoring unit 17 performs in the same manner as anordinary called telephone instrument, insofar as the central office 60 is concerned. Consequently, unit 17 does not disturb an associated telephone system; and the central office operator, or accounting machinery, can make an appropriate service charge against the calling party at telephone 58 for a completed call.

The central office battery corresponds to the battery 19 illustrated in FIG. 1, and its output is substituted for the ringing current in the usual manner for telephone switching stations to operate equipment on the subscriber's premises as is well known in the art. Since the oscillator circuit 48 of FIG. 1 has distinctive output signals for every condition of contacts 53, and since those distinctive signals are different from any of the normal telephone supervisory signals, the calling party at the telephone 58 in FIG. 4 is readily able to determine, first, whether or not his call was actually completed to the monitoring unit 17 and, second, the status of the contact 53 in the monitoring unit 17.

In FIG. 2 there is illustrated a schematic diagram of a switching circuit 40 of the type employed in FIG. 1. This circuit includes a bistable multivibrator incorporating a relay to perform the previously described connecting functions. The direct charge potential appearing across capacitor 42 in FIG. 1 is applied to leads 38 and 39 in FIG. 2 and is coupled to the operating coil 61 of a relay via a resistor 62, a varistor 63, a further resistor 66, and another varistor 67. When the charge potential appearing between leads 38 and 39 attains sufficient magnitude, varsitors 63 and 67 begin to conduct current through relay coil 61. When that current attains sufficient magnitude, a set of normally open contacts 68 controlled by the relay are closed. The relay structure is illustrated in the conventional detached contact schematic representation whereby the operating coil of the relay and the contacts controlled thereby are illustrated in their most convenient location in the drawing for clear understanding thereof and are associated through descriptive text.

Upon the operation of the contacts 68, direct current flows to a pair of NPN transistors 69 and 70 that are connected in a bistable multivibrator circuit. The emitter electrodes of the transistors are connected together and, through contacts 68, to the lead 43. The collector electrode of transistor 70 is connected through resistor 62 and the operating coil 61 to the leads 39 and 47. The collector electrode of transistor 69 is connected through a resistor 71 to the lead 39. A resistor 72 and the varistor 63, which is bypassed to aid switching by a capacitor 64, cross-couple the collector and the base electrodes of transistors 69 and 70.

In the arrangement for bridge 30 which is illustrated in FIG. 1, lead 38 is normally negative with respect to lead 39 when capacitor 42 is charged by alternating current from source 24. Lead 43 is also negative with respect to lead 39 as a result of the arrangement of bridge 45. Accordingly, the base-emitter junction of transistor 70 is forward biased when contacts 68 are first closed, and this transistor conducts at that time. The negative potential applied from lead 38 reversely biases the base-emitter junction of transistor 69 to hold that transistor nonconducting as long as varistors 63 and 67 are conducting. When capacitor 42 discharges partially, varistors 63 and 67 cease conducting; and transistor 69 has no base current input, so it remains nonconducting. Thus, until further change in the monitoring unit takes place, transistor 70 conducts and the direct potential on leads 43 and 39 is applied to the leads 46 and 47, as hereinbefore mentioned.

Termination of the switching circuit operation in FIG. 2 is accomplished on one of two ways. The direct current supply may be removed by opening switch 18 at control station 10 and thereby disabling transistor 70 and relay coil 61. Alternatively, capacitor 42 discharges through the varistors 63 and 67 as previously described and through resistor 41. As the capacitor discharges, the current flowing in varistors 63 and 67 is reduced. Ultimately conduction in those varistors is discontinued, but conduction in varistor 67 is thereafter resumed in the opposite direction when capacitor 42 has discharged sufficiently to make lead 38 more positive than lead 43 by the amount of the breakdown voltages of varistor 67 and the base-emitter junction of transistor 69. Upon resumption of conduction in the opposite direction in varistor 67, current applied to the base electrode of transistor 69 biases that transistor into conduction. The usual regenerative multivibrator action causes transistor 70 to be biased to its nonconducting condition thereby disabling the operating relay coil 61. This action causes contacts 68 to be restored to their normal open condition and removes the direct potential from the leads 46 and 47, thereby disabling oscillator circuit 48 as previously described.

Illustrated in FIG. 3 is one form of the previously mentioned two-mode oscillator circuit 48. The application of direct current to the leads 46 and 47 initiates the charging of a capacitor 73 through a resistor 76. The initial charge on that capacitor imposes a forward bias on the emitter-base junction of a PNP transistor 77 to initiate oscillatory action. Oscillator 48 employs base-to-emitter feedback through the windings 78 and 79 of a transformer which also includes the output winding 50, previously mentioned. A capacitor 80 shunts the winding 78 to form therewith a resonant circuit appropriate to the frequency at which it is desired to generate the oscillations of FIGS. 3A and 3B. The initial conduction through the emitter-base junction of transistor 77 produces oscillations in that resonant circuit which are re-enforced by the aforementioned feedback. A resistor 81 is connected in series between lead 47 and winding 79 to establish a desired impedance relationship in the oscillator for both continuous and squegging operation.

When contacts 53 are open, winding 79 is effective in the oscillator circuit and cooperates with winding 78 to build up oscillations therein. The charge on capacitor 73 is increased in a direction to oppose the applied direct potential from leads 46 and 47 each time that the peaks of oscillations in the resonant circuit bias transistor 77 for conduction. Ultimately, therefore, the charge on capacitor 73 attains a sufficient level to block transistor conduction, and a quasi steady state persists briefly. Any small disturbance in the circuit which momentarily decreases the amplitude of the oscillation causes the loop gain to decrease below unity, and the oscillations decrease even more. In other words, this steady state is unstable. Oscillation quickly stops. Thereafter, the resonant circuit receives no additional current pulses through the transistor until capacitor 73 has discharged through resistor 76 sufficiently to reverse its potential and forward bias transistor 77 once more. At that time oscillations are resumed again, and the circuit continues in this squegging mode as long as the necessary direct potential is present on leads 46 and 47.

If contacts 53 are closed, the impedance relationships in the oscillator are changed because the winding 74 appears as an amplitude limiting element in the oscillator due to a varistor 75 in series therewith. Varistor 75 prevents ampltiude build-up to a sufficiently high level for capacitor 73 to become charged and block transistor 77. Thus, the circuit oscillates continously in the usual manner for an inductance-capacitance oscillator with a resonant circuit arranged in a feedback path. Here, the steady state is stable, because the ampltiude limiting varistor causes an increase in loop gain if a small decrease in amplitude occurs (and a decrease in gain if an increase in amplitude occurs) thereby maintaining a steady amplitude of oscillation in the presence of circuit noise.

It will be observed that the contacts 53 are magnetically coupled to the oscillator 48, and that the oscillator does not begin to function until after the monitor unit 17 has been interrogated by the closing of switch 18 in control station 10. Accordingly, contacts 53 may be closed for prolonged periods without causing any power drain and without imposing a burden on central office equipment if the unit is used in a telephone system.

Illustrated in FIG. 5 is a modified embodiment of the invention which produces essentially the same overall results but utilizes a number of circuit variations. Circuit elements corresponding to those already described in other figures are identified by corresponding reference characters. Resistors 82 and 83 are advantageously added to the input of the monitoring unit between the terminals 13 and 16 and the polarity guard rectifier bridge 45 to protect the device from large currents due to lightning. Capacitor 42 is charged in a somewhat similar manner to that previously described in connection with FIG. 1, however, in this case the rectifier bridge 30 in the rectifying means of the monitor unit is replaced by a pair of diodes 86 and 87 to form with capacitor 42 and the capacitors 32′ a voltage multiplying, or doubling, type of rectifier connection.

If in a particular cycle of alternating input current to the monitoring unit the terminal 13 is more positive than terminal 16, diode 87 conducts to charge capacitor 42. On the following negative half-cycle of the alternating current, diode 86 conducts to shunt such current around capacitor 42 and impose a corresponding charge upon the capacitors 32′. During the next succeeding positive half-cycle, the alternating potential applied to the monitoring unit is aided by the previously imposed charge on capacitors 32′ and thereby imposes a larger total charge on capacitor 42. Nevertheless a direct potential corresponding to the charge on capacitor 42 is applied to leads 38 and 39 the same as in FIG. 1.

Switching circuit 40′ in FIG. 5 has a form which is quite different from that illustrated for circuit 40 in FIG. 2. Leads 38 and 39 are connected to a series combination of a thermistor 88, a reverse breakdown diode 89, and the relay operating coil 61. Diode 89 is the type which conducts in the reverse direction with a substantially constant potential difference in spite of current changes. Thermistor 88 and diode 89 initially present a very high impedance to capacitor 42 and permit no significant discharge thereof. However, as the charge potential across that capacitor increases beyond the breakdown potential of diode 89, the leakage current causes the resistance of thermistor 88 to be reduced quite rapidly. This lowered resistance of thermistor 88 permits capacitor 42 to discharge at a relatively high rate through the relay operating coil 61. Relay 61 closes its contacts 68 as before and applies direct operating potential from the polarity guard bridge 45 to a combination of three transistors 90, 91 and 92.

Transistor 92 receives at its base electrode, through a resistor 93, the positive charge potential from capacitor 42 and is biased into conduction after contacts 68 close. The collector current of transistor 92 flows out of the base electrode of PNP transistor 91 to bias that transistor into conduction. This action also permits NPN transistor 90 to conduct so that current is supplied to operating coil 61 through the collector-emitter circuits of transistors 90 and 91 and through a current limiting lamp 96. Thus, transistors 90 and 91 are semiconductor switches which supply operating current to relay coil 61, and transistor 92 is a switching device for controlling the current supply path through the aforementioned transistors to relay coil 61. A potential divider including resistors 97 and 98 is employed to establish the potential level of the base electrode of transistor 90. Thus the large voltage across the device when the line current decreases to near zero is shared equally between transistors 90 and 91. An additional current path, including a resistor 99 and the varistor 49, is arranged to provide direct operating potential on leads 46 and 47 for the oscillator circuit 48′.

Oscillator circuit 48′ has the same two modes of operation as does the oscillator described in connection with FIG. 3. In this case the oscillator employs an NPN transistor 77′ with collector-base feedback instead of emitter-base feedback. A resistor 100 and a diode 101 are added to the base circuit in series with transformer winding 78 to prevent reverse breakdown of the base-emitter junction of transistor 77′ on large negative potential swings at the base electrode thereof. This latter precaution is not required for all types of transistors, as is well known in the art.

A capacitor 102 couples the output of oscillator 48′ to the collector electrode of transistor 90. The output oscillations are then coupled from that point through the contacts 68, the lead 43, rectifier bridge 45, and the terminals 13–16 to the control station 10. Such oscillations are superimposed as a ripple on the direct current in bridge 45 and are not rectified.

Figure 6:
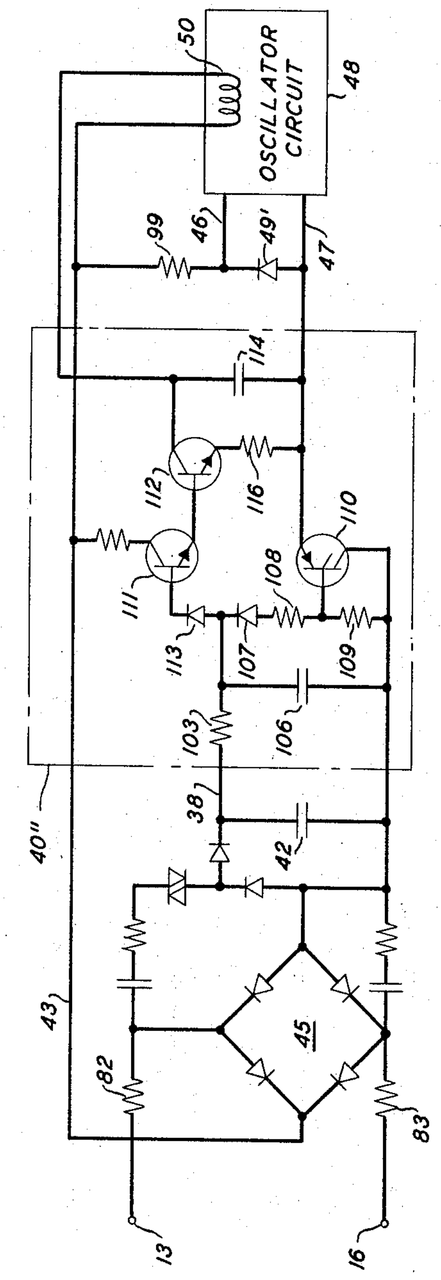

A further embodiment of the invention is illustrated in FIG. 6. The monitoring unit input connections and voltage doubling arrangement are in this case the same as those previously discussed in connection with FIG. 5. The switching circuit 40″ is the principal area of difference. In this case the charge voltage across capacitor 42 is coupled through a resistor 103 and a capacitor 106 which form an integrating circuit. Upon the attainment of sufficient charge across capacitor 106, a reverse breakdown diode 107 is driven into its reverse conduction region to permit current flow through the series connected resistors 108 and 109. A positive potential difference appearing between the terminals of resistor 109 is coupled to the lower PN junction of a PNPN controlled rectifier, or switch, 110 and tends to trigger such rectifier into condition. This bias tendency is maintained for a finite time interval after switch 21 in FIG. 1 has been released to substitute direct current for alternating current at the input terminals 13 and 16.

The direct current from station 10 is applied through the rectifier bridge 45, as previously described, to provide operating current for two transistors 111 and 112. Transistor 111 also receives at its base electrode and from a diode 113, the positive potential at the cathode of reverse breakdown diode 107, and that positive potential is sufficient to bias transistor 111 into conduction when collector current is available from lead 43. A positive bias is thereby applied also to the base electrode of transistor 112 to bias it into conduction. Operating current is supplied from lead 43 to the collector electrode of transistor 112 through the transformer winding 50 of oscillator 48. The combined emitter electrode currents of transistors 111 and 112 are applied through a resistor 116 to the controlled switch 110. This current, together with the conducting bias applied through the resistor 109, biases rectifier 110 into conduction to complete a return current path for the direct current from lead 47 to lead 39. Resistor 99 and a reverse breakdown diode 49' develop the necessary potential at leads 46 and 47 in the manner described in connection with FIG. 1.

The output of oscillator 48 appears across its transformer winding 50 as in FIG. 3 and this output is applied in series with the collector circuit of transistor 112. Consequently, the oscillations are coupled through a capacitor 114, shunting transistor 112 and resistor 116, and the switch 110 to the rectifier bridge 45 as previously described in connection with FIG. 5. That bridge applies the oscillations to the input terminals 13 and 16 of the monitoring unit for transmission back to the control station superimposed upon the direct current being received therefrom.

It will, of course, be apparent to those skilled in the art that, in the embodiment of FIG. 6, the output of oscillator 48 must be held to an amplitude which is sufficiently small that the oscillations do not offset the conducting bias signals on transistor 112 and on switch 110 and thereby drive either of those devices to its nonconducting condition and interrupt the supply path for operating energy to the oscillator. As in the previously described embodiments, capacitor 42 can effect turn off. Upon the removal of alternating current supplied from control station 10, capacitor 42 begins to discharge and ultimately attains a charge potential which is sufficiently low to be unable to maintain conduction in transistor 111 any longer. Accordingly, that transistor is biased to a nonconducting condition and similarly biases transistor 112, thereby depriving switch 110 of substantially all of its direct current so that such switch spontaneously returns to a nonconducting condition.

Although this invention has been described in connection with particular embodiments thereof, it is to be understood that additional embodiments and modifications which will be obvious to those skilled in the art are included within the spirit and scope of the invention.

What is claimed is:

1. A condition monitoring unit comprising
an electric circuit for transmitting both alternating current and direct-current energy,
an oscillator having distinct modes of operation,
means responsive to a monitored condition for controlling the mode of operation of said oscillator,
coupling means responsive to alternating current in said electric circuit for coupling said circuit to apply direct-current operating energy to said oscillator and simultaneously to couple output oscillations from said oscillator to said circuit,
means in said coupling means connected to said circuit for rectifying said alternating current,
means in said coupling means accumulating an electrostatic charge in response to said rectifying means, and switching means in said coupling means connected to said circuit and adapted to be actuated in response to a predetermined minimum charge level on said accumulating means, said switching means being further adapted to couple direct current from said circuit to said oscillator.

2. A monitoring unit in accordance with claim 1 in which said switching means comprises
a relay having an operating coil and having normally open contacts,
a flip-flop circuit connected to receive direct-current operating energy from said circuit through said normally open contacts, and
means including a portion of said flip-flop circuit coupling said charge accumulating means to said operating coil for actuating said relay in response to said charge level.

3. The monitoring unit in accordance with claim 1 in which
said rectifying means comprises a diode bridge circuit having one pair of diagonally opposite terminals connected to the two sides of said circuit and a voltage multiplying circuit connected to said accumulating means, and
said switching means is adapted to connect said oscillator between a second pair of diagonally opposite terminals of said bridge.

4. The monitoring unit in accordance with claim 1 in which said switching means comprises
a relay having an operating coil thereof connected to be actuated by said accumulating means,
a set of normally open contacts operatively associated with said relay,
a flip-flop circuit including said operating coil and adapted to receive operating energy from said circuit through said normally open contacts and to receive triggering signals from said accumulating means, and
means including said contacts coupling said oscillator to said circuit.

5. The monitoring unit in accordance with claim 3 in which said switching means comprises
a PNPN triode having a control electrode connected to be actuated by the output of said accumulating means, and
means connecting the remaining terminals of said triode between said oscillator and a terminal of the second diagonal of said bridge.

6. The monitoring unit in accordance with claim 5 in which there is further provided
switching means connected between a terminal of said triode and another terminal of the second diagonal of said bridge to supply current directly to said triode from said bridge in a path shunting said oscillator,
means actuating said switching means in response to the output of said accumulating means, and
means applying the output of said oscillator in series in said path.

7. The monitoring unit in accordance with claim 3 in which said switching means comprises
a thermistor,
a relay having the operating coil thereof connected in series with said thermistor across the output of said accumulating means,
said relay including normally open contacts,
semiconductor switching means connected in series with said contacts and said operating coil across the second diagonal of said bridge,
means actuating said semiconductor switching means in response to a predetermined charge level at the output of said accumulating means, and
means connecting said oscillator to the second diagonal of said bridge through said normally open contacts and said semiconductor switching means.

8. The monitoring unit in accordance with claim 3 in which said oscillator includes
impedance means adapted to cause said oscillator to produce a squegging output oscillation mode,
contact means operable in response to a monitored condition, and
inductive coupling means for coupling said contacts to said oscillator to alter the impedance relationships therein in response to operation of said contacts for causing said oscillator to be thrown into a continuous mode of operation.

9. A condition monitoring unit comprising
an electric circuit oscillator having at least two characteristically different output signals,
means controlling said oscillator to produce different ones of said output signals in response to different statuses of a monitored condition,
an electric circuit for transmitting both varying current and direct-current energy, and
switching means coupled to said circuit and responsive to said varying current energy for coupling said oscillator to said circuit to apply said direct-current energy to said oscillator and to apply the output of said oscillator to said circuit, the impedances of said oscillator and said switching means being adapted to present to the said electric circuit a first net impedance when said unit is receiving only said varying current and a second net impedance when said unit is supplying said output signals to said electric circuit.

10. A condition monitoring unit comprising
an electric circuit oscillator having at least two characteristically different output signals, means controlling said oscillator to produce different ones of said output signals in response to different statuses of a monitored condition,
an electric circuit for transmitting both varying current and direct-current energy,
switching means coupled to said circuit and responsive to said varying current energy for coupling said oscillator to said circuit to apply said direct-current energy to said oscillator and to apply the output of said oscillator to said circuit,
a first rectification circuit and a charge storage means for coupling said switching means to said electric circuit for receiving said varying current energy,
a second rectification circuit for coupling said direct-current energy to said switching means, and
connections for coupling said output signals from said switching means to said electric circuit through said second rectification circuit, said first rectification circuit including amplitude-responsive impedance means adapted to present a substantially higher impedance to said output signals than to said varying current energy.

References Cited

UNITED STATES PATENTS

| | | | |
|---|---|---|---|
| 2,042,532 | 6/1936 | Johnston | 179—2 |
| 2,926,344 | 2/1960 | Koehler | 179—2 |
| 3,072,894 | 1/1963 | Chapin | 179—2 |

DAVID G. REDINBAUGH, *Primary Examiner.*

J. T. STRATMAN, *Assistant Examiner.*